Feb. 9, 1926. 1,572,369

D. SINCLAIR

EXTENSION PEDAL TREAD

Filed Sept. 12, 1923

Inventor
Daniel Sinclair.

By Horace C. Chandlee
Attorney

Patented Feb. 9, 1926.

1,572,369

UNITED STATES PATENT OFFICE.

DANIEL SINCLAIR, OF NEW YORK, N. Y., ASSIGNOR TO JESSIE J. SINCLAIR, OF NEW YORK, N. Y.

EXTENSION PEDAL TREAD.

Application filed September 12, 1923. Serial No. 662,263.

*To all whom it may concern:*

Be it known that I, DANIEL SINCLAIR, a citizen of the United States, residing at New York, in the county of New York and State of New York, have invented certain new and useful Improvements in Extension Pedal Treads; and I do hereby declare the following to be a full, clear, and exact description of the invention, such as will enable others skilled in the art to which it appertains to make and use the same.

This invention relates to new and useful improvements in automobile devices and particularly to devices for attachment to brake and clutch pedals.

One object of the invention is to provide a device of this character which is arranged to be clamped to the tread portion of the ordinary pedal, whereby the driver may easily and comfortably reach the pedal, without resorting to the use of additional back cushions on the seat.

Another object is to provide a device of this character by means of which the tread of the pedal may be raised to be within easy reach of the foot of the driver having short legs.

A further object is to provide a novel and improved adjustment of such an attachment for a pedal, whereby the movable clamping jaw, forming a part thereof, may be moved into firm engagement with the pedal tread upon the turning of the adjustment screw.

Other objects and advantages will be apparent from the following description when taken in connection with the accompanying drawing.

Figure 1:
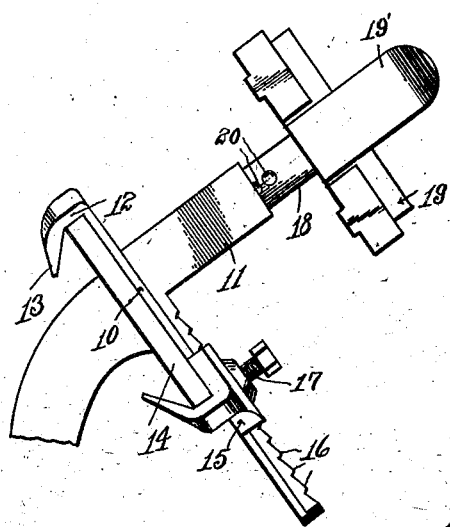
Figure 1 is a side elevation of the attachment applied to a pedal.

Referring particularly to the accompanying drawing, 10 represents the base of the attachment which is elongated and has a tubular member 11 extending from one of its wider faces, said tube being preferably angular in cross section, and being formed adjacent one end of the base. Formed on the end of the base, adjacent the tubular member 11 is the transversely extending jaw member 12, which has the lower lip 13, which cooperates with the upper portion of the jaw, to embrace one edge portion of the pedal tread 14. Slidable on the other end of the base, and extending transversely thereof, is the movable jaw 15, said jaw being formed similarly to the jaw 12, and being arranged to embrace the opposite edge portion of the pedal tread 14. Formed transversely in the wider face of the base which carries the tubular member 11 are the inclined notches 16, with which is arranged to be engaged the inner end of the clamping screw 17, threaded through one face of the movable jaw 15.

Received slidably in the tubular member 11 is the angular stem 18 of the supplemental pedal tread 19, said stem being formed with a longitudinal series of depressions 20, in each of two of its opposite longer faces, for the reception of the inner end of the binding screw 21, said screw being engaged through one side of the tubular member 11.

It will be noted that the clamping jaws 12 and 15 are arcuate transversely of the base 10, so that they will readily receive the curved edge portions of an elliptical pedal tread. However, when the clamp is applied to a pedal tread having straight sides, such sides will be engaged by the opposite ends of the jaws 12 and 15, so that the said jaw ends will bite into the pedal tread and prevent any tendency of the clamp to move longitudinally thereon.

Figure 3:
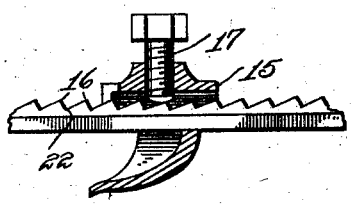
Figure 3 is an enlarged vertical sectional view on the line 3—3 of Figure 2.
Figure 2:
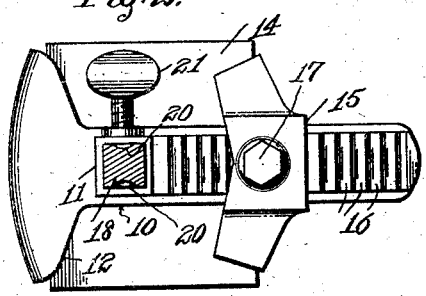
Figure 2 is a plan view with the tread portion removed, and the stem thereof shown in section.
Figure 5:
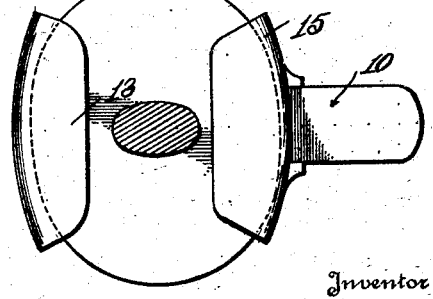
Figure 5 is a view similar to Figure 4, showing the jaws engaged with an elliptical pedal tread.
Figure 4:
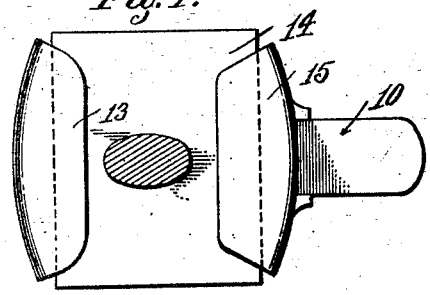
Figure 4 is a bottom plan view of the device, showing the jaws engaged with an angular pedal tread.

Upon reference to the sectional view, Figure 3, it will be noted that each of the notches has a wall extending at right angles from the face of the base 10, and its other wall extending from the base to meet the first wall at an acute angle, as shown at 22. It will also be noted that the inner end of the screw 17 engages on this inclined face or wall, so that when the jaw 15 is advanced into engagement with the side of a pedal tread, turning of the screw will cause the screw to ride down the inclined wall, thus forcing the jaw 15 into a more firm engagement with the pedal tread.

The supplemental tread 19 has a finder tongue 19' extending from one side thereof, so that the driver may know when his foot is squarely on the tread. It is sometimes desirable to dispose this finder tongue on the other side, and in this event, the stem of the tread is removed from the tubular member 11, and reversed. The other series of depressions 20 will then be in position to receive the inner end of the screw 21.

What is claimed is:

1. In a pedal attachment, the combination with a base having a tubular projection for the reception of the stem of a supplemental tread, of a stationary pedal tread engaging jaw, a movable jaw on the base, a clamping screw carried by the movable jaw, and means on the base for engagement by the screw for advancement of the jaw into gripping position upon turning the screw.

2. In a pedal attachment, the combination with a base having a rigid pedal-tread engaging jaw at one end, a jaw slidable on the other end of the base, a tubular projection extending from the base and arranged to adjustably receive the stem of a supplemental tread, and inclined faces on the base for engagement by said screw for advancing the movable jaw into gripping position upon turning the screw.

3. In a pedal attachment, the combination with a base having a rigid jaw on one end formed with a socket for the reception of a portion of an elliptical pedal tread at times, and the straight side of a pedal tread at times, a series of transverse inclined notches on the base, a slidable jaw on the notched portion of the base, said slidable jaw being formed similarly to the rigid jaw, and a screw engaged through the movable jaw and arranged to slide on the faces of the notches to advance the jaw into gripping position upon turning the said screw.

In testimony whereof I affix my signature.

DANIEL SINCLAIR.